(12) United States Patent
Yamazaki et al.

(10) Patent No.: US 7,543,574 B2
(45) Date of Patent: Jun. 9, 2009

(54) CANISTER

(75) Inventors: Koji Yamazaki, Saitama (JP); Takashi Hasumi, Tokyo (JP); Kenji Seki, Osaka (JP)

(73) Assignees: Mahle Filter Systems Japan Corporation, Tokyo (JP); Oskak Gas Co., Ltd., Osaka-shi (JP)

( * ) Notice: Subject to any disclaimer, the term of this patent is extended or adjusted under 35 U.S.C. 154(b) by 0 days.

(21) Appl. No.: 11/896,693

(22) Filed: Sep. 5, 2007

(65) Prior Publication Data
US 2008/0184973 A1    Aug. 7, 2008

(30) Foreign Application Priority Data
Sep. 13, 2006 (JP) ............... 2006-247557

(51) Int. Cl.
F02M 33/02 (2006.01)
F02M 33/04 (2006.01)

(52) U.S. Cl. .................................. 123/519

(58) Field of Classification Search ............ 123/519, 123/518, 520, 516, 41.31; 96/146, 144, 130, 96/131
See application file for complete search history.

(56) References Cited

U.S. PATENT DOCUMENTS

| | | | |
|---|---|---|---|
| 4,308,840 A * | 1/1982 | Hiramatsu et al. ......... 123/519 |
| 5,632,808 A * | 5/1997 | Hara et al. .................. 96/137 |
| 5,915,364 A * | 6/1999 | Katou et al. ................ 123/519 |
| 6,503,301 B2 * | 1/2003 | Uchino et al. ............... 96/132 |
| 6,695,896 B2 * | 2/2004 | Hara et al. .................. 96/121 |
| 7,323,041 B2 * | 1/2008 | Yoshida et al. ............. 96/132 |
| 2001/0015134 A1 | 8/2001 | Uchino et al. |
| 2004/0261777 A1* | 12/2004 | Ogawa ..................... 123/698 |
| 2005/0188851 A1 | 9/2005 | Yamazaki et al. |
| 2005/0247202 A1 | 11/2005 | Seki |
| 2006/0196480 A1* | 9/2006 | Kosugi et al. ............. 123/516 |

FOREIGN PATENT DOCUMENTS

| JP | 2001-248504 A | 9/2001 |
|---|---|---|
| JP | 2005-233106 A | 9/2005 |
| WO | WO 03-106833 A1 | 12/2003 |

* cited by examiner

Primary Examiner—Mahmoud Gimie
(74) Attorney, Agent, or Firm—Foley & Lardner LLP

(57) ABSTRACT

A canister includes a casing having a gas passage which extends from a first passage end formed with a charge port to let in fuel vapor and a purge port to let out the fuel vapor, to a second passage end formed with an atmospheric air port to let in air, and which includes a heat storing and adsorbing chamber in which a granular adsorbing material and a granular heat storing material are held. The granular heat storing material contains capsules each including a phase-change material enclosed in a multilayer outer shell which includes an inner layer of a hydrophobic resin and an outer layer of a hydrophilic resin covering the inner layer.

8 Claims, 3 Drawing Sheets

CANISTER

BACKGROUND OF THE INVENTION

The present invention relates to a canister using adsorbing material or adsorbent such as activated carbon and especially to a canister usable for treatment of fuel vapor of an internal combustion engine of a vehicle, for example. Furthermore, the present invention relates to heat storing material usable in a canister, and method for producing the heat storing material and/or a canister using the heat storing material.

In a system of an internal combustion engine for a vehicle, for example, there is generally provided a canister capable of adsorbing and releasing fuel vapor produced by evaporation in a fuel tank, in order to prevent emission of fuel vapor into the atmosphere. The canister is arranged to trap or adsorb fuel vapor generated, for example, in the stop state of a vehicle, and to purge or release the trapped fuel vapor with fresh air, for combustion disposal in the internal combustion engine during operation of the engine. In the case of adsorption in a canister utilizing an adsorbing material such as activated carbon, the temperature in the canister becomes higher because of exothermic reaction, and the temperature increase tends to deteriorate the adsorbing performance. In the case of desorption of fuel vapor, on the other hand, the reaction is endothermic, and the temperature becomes lower so that the desorbing performance becomes poorer.

To meet this problem, a patent document 1, US 2001/0015134 A1 (≈JP 2001-248504 A≈EP 1 113 163A2)) proposes a fuel vapor treatment canister including a vapor adsorption chamber which is formed on a fuel vapor inlet/outlet side and which contains a vapor adsorbing material, and a heat accumulation and vapor adsorption chamber which is formed on an air inlet side of the canister casing and which contains a heat storing (or heat accumulating) material as well as the adsorbing material.

To meet the above-mentioned problem, a patent document 2, US 2005/0247202 A1 (≈WO2003/106833≈EP 1 536 128 A), and a patent document 3, US 2005/0188851 A1 (≈JP 2005-233106≈EP 1 566 535 A) propose technique of restraining temperature change due to adsorption and desorption and improving adsorbing and desorbing ability by filling the inside of a canister with not only an adsorbing material but also a heat storing material formed into a granular form by adding a binder to micro capsules each enclosing a phase-change material for absorbing latent heat and releasing heat with phase change.

SUMMARY OF THE INVENTION

As the phase-change material, it is preferable to use organic compound having a melting point at or near a normal temperature and repeating melting and solidification in a canister. As the adsorbing material, it is preferable to use activated carbon capable of adsorbing organic compound. Therefore, if the organic compound used as the phase-change material leaks out of the micro capsules in the canister, the organic compound is trapped by the activated carbon. As a result, the leakage of phase-change material can clog up micro pores of the activated carbon, and hence deteriorate the performance of the canister by impairing the adsorbing ability.

The organic compound could leak out of micro capsules for the following reason. Preferable examples of the phase-change material are straight chain aliphatic hydrocarbon such as hexadecane or octadecane, fatty acid, higher alcohol, ester compound and wax, such as natural wax or petroleum wax, containing one or more of these substances. On the other hand, a preferable example of the material for the outer shell encapsulating the phase-change material in the form of micro capsules is a hydrophobic thermosetting resin such as melamine resin or urea resin, superior in mechanical strength. Therefore, in the canister in which the heat storing material containing micro capsules is exposed to the atmosphere of fuel vapor, there is a possibility of incurring permeation (osmosis) or passage of the phase-change material (organic compound) on the inside and the fuel component (organic compound) on the outside through the thermosetting resin of the outer shell as a membrane.

In the case of blended fuel containing different kinds of organic compounds, specifically in the case of ethanol-blended gasoline, noted as one of countermeasures against the global warming, containing ethanol which is small in carbon number, ethanol or other component could blend with the phase-change material by the permeation, thereby change the solidification temperature of the phase-change material, and deteriorate the adsorbing ability of the adsorbing material.

Moreover, if the sizes (volumes) of the micro capsules are changed by the above-mentioned permeation, micro capsules could be removed from granulates into which the micro capsules and the binder are formed, because of rubbing and vibration among the heat storing material and adsorbing material filled in a heat storing and adsorbing chamber, and the removed micro capsules could flow into the intake system of the engine, and impair the combustion stability in the engine.

It is therefore an object of the present invention to provide a canister to meet the above-mentioned problem. According to one aspect of the present invention, a canister comprises a casing, a granular heat adsorbing material and a granular adsorbing material. The casing includes a gas passage which extends from a first passage end formed with a charge port to let in fuel vapor and a purge port to let out the fuel vapor (to an intake system of an engine, for example), to a second passage end formed with an atmospheric air port to let in air. The gas passage includes a heat storing and adsorbing chamber in which the granular heat storing material is held together with the granular adsorbing material. The granular heat storing material contains capsules, such as micro capsules, each including a phase-change material enclosed in a multilayer outer shell which includes an inner layer of a hydrophobic resin and an outer layer of a hydrophilic resin covering the inner layer.

According to another aspect of the invention, a granular heat storing material comprises capsules, such as micro capsules, each including a phase-change material enclosed in a multilayer outer shell which includes an inner layer of a hydrophobic resin and an outer layer of a hydrophilic resin covering the inner layer.

DETAILED DESCRIPTION OF THE INVENTION

Figure 1:
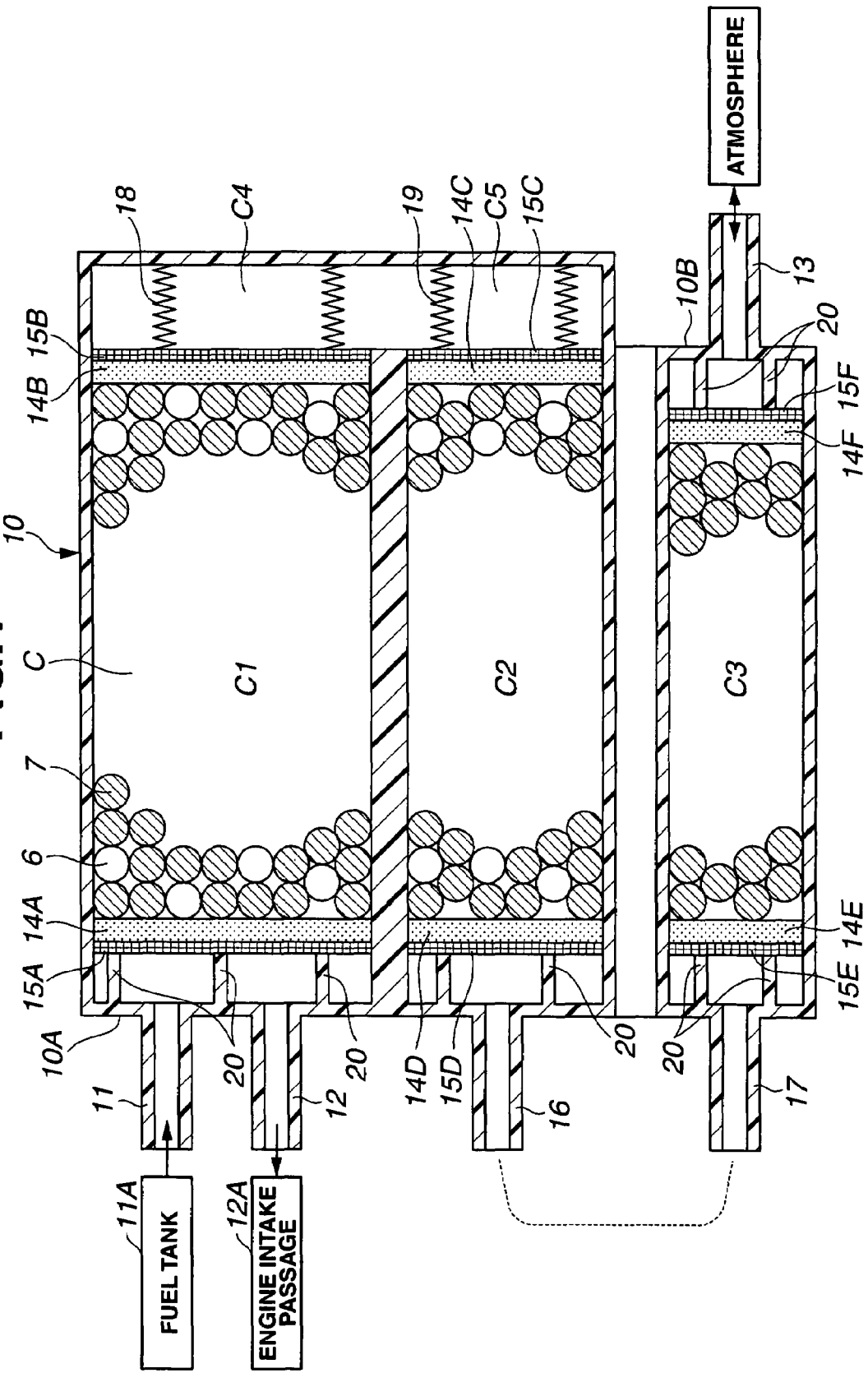
FIG. 1 is a schematic sectional view showing a canister of a first practical example according to an embodiment of the present invention.

According to one embodiment of the present invention, a canister includes at least: a casing formed with a gas passage extending from a first passage end to a second passage end; a granular adsorbing material enclosed in the casing; and a granular heat storing material enclosed in the casing. At the first passage end, there are formed a charge port to receive fuel vapor to be introduced into the canister, and a purge port to lead to an intake system of an internal combustion engine. At the second passage end, there is formed an atmospheric air port opening to an outside, that is, the atmosphere. In the gas passage between the first and second passage ends, there is formed at least one heat storing and adsorbing chamber which is loaded or filled with the granular heat storing material together with the granular adsorbing material. The granular heat storing material is in the form of particles or small pieces containing capsules (such as micro capsules) having a multilayer structure including a multilayer outer shell enclosing a core (or central portion) of a phase-change material to absorb and release latent heat in dependence on temperature change. The multilayer outer shell includes at least an inner layer of hydrophobic resin (synthetic resin) enclosing the core, and an outer layer of hydrophilic resin (synthetic resin) covering the inner layer.

As the capsules, it is possible to use micro capsules of known types as disclosed in the above-mentioned patent documents 2 and 3. As the phase-change material, it is preferable to use an organic compound having a melting point in the range of 10° C.~80° C. Examples of the phase-change material are: straight chain aliphatic hydrocarbons such as tetradecane, pentadecane, hexadecane, heptadecane, octadecane, nonadecane, eicosane, henicosane, and docosane; natural wax; petroleum wax; fatty (aliphatic) acids such as capric acid and lauric acid; higher alcohols having a carbon number in the range of 12~15; and esters such as methyl palmitate and methyl stearate. Moreover, it is possible to employ, as the phase-change material, any two or more of these organic compounds. In order to prevent supper cooling of the phase-change material, it is optional to add a compound having a melting point higher than the melting point of the phase-change material.

As the inner layer 2 of outer shell 4 of the micro capsule 5, it is possible to use a hydrophobic thermosetting resin such as melamine resin and urea resin. Specifically, melamine resin is preferable because of its superior mechanical strength. An intermediate heat storing body or material having such an inner layer can be produced by a known encapsulating method such as coacervation method and in-situ method (interface reaction method) by using the phase-change material as core material.

As the outer layer 3 of outer shell 4 of the micro capsule 5, it is possible to use material including as a main component, a hydrophilic thermoplastic resin including at least one hydrophilic group, typified by polyvinyl alcohol, polyacrylamide, and ethylene vinylalcohol. Specifically, polyvinyl alcohol is preferable. Especially when the inner layer 2 is made of hydrophobic thermosetting resin, the outer layer 3 of such a hydrophilic thermoplastic resin can prevent or restrain the above-mentioned permeation effectively while keeping the superior mechanical properties of the inner layer. After the synthesis of the intermediate heat storing body including the inner layer in a liquid medium, the outer layer in the form of a film coating the inner layer can be formed by adding, to a slurry of the intermediate thermo storing body, the above-mentioned hydrophilic thermoplastic resin, and drying by a known drying method such as spray drying.

The particle diameter or particle size of the thus-produced micro capsules as powder heat storing material is preferably in the range of about several micrometers ($\mu$m)~several tens of micrometers ($\mu$m). If the micro capsule is too small, the proportion or percentage occupied by the outer shell becomes greater and the proportion of the phase-change material repeating the melting and solidification becomes smaller, so that the quantity of heat storage per unit volume becomes smaller. If the size of the micro capsule is too large, the micro capsule requires a greater strength, hence the proportion of the outer shell is increased, and the quantity of heat storage per unit volume decreases in this case, too.

Preferably, the thus-produced powder heat storing material in the form of powder of micro capsules is formed together with a binder into a formed or molded heat storage material in the form of shaped particles each having an appropriate shape and dimensions. By using only the heat storing material in this way, it is possible to minimize breaking of micro capsules during the forming process. There are various substances which can be used as the binder. An example is a binder including as a main component a thermosetting resin such as phenolic resin or acrylic resin in view of the strength and stability against the temperature and solvent required by the canister, the affinity with the hydrophilic thermoplastic resin of the outer layer of the micro capsule, and the resistance to water and oil. Especially, phenolic resin which is short in the length of unit chain (having many cross-linking bonds) is preferable.

The thus-formed granular heat storing material in the form of particles is put, together with an granular adsorbing material, into a heat storing and adsorbing chamber formed in the gas passage for conveying fuel vapor within the canister. Preferably, the heat storing and adsorbing chamber is filled with the granular heat storing material and the granular adsorbing material, and the inside of the chamber is held in a pressurized state by a pressing mechanism of a movable partition separating the heat storing and adsorbing chamber and a space (unfilled) chamber, and an urging member for urging the movable partition to the side of the heat storing and adsorbing chamber. The pressing mechanism can pressurize the contents of the heat storing and adsorbing chamber while maintaining the intended heat storing function, and hold the heat storing material and the adsorbing material stably and steadfastly in the chamber even when the volumes of the micro capsules are increased or decreased. As a result, the canister can protect the heat storage material against deterioration and damage due to vibration and abrasion, and reliably prevent micro capsules cemented together by the binder from being removed and drawn into the intake system of the engine.

Preferably, the gas passage is provided with an adsorption chamber which is located on the atmospheric air port's side of the heat storing and adsorbing chamber (between the heat storing and adsorbing chamber and the atmospheric air port) and which is loaded or filled with the granular adsorbing material only. In this case, during a charging operation of charging fuel vapor into the canister for adsorption, the fuel vapor is first adsorbed in the adsorbing material in the heat storing and adsorbing chamber located in the gas passage at a position closer to the charge port, and heat generated by the adsorption is absorbed and canceled effectively by the heat storing material. Therefore, the heat storing and adsorbing chamber can trap most of the fuel component. Furthermore, the adsorption chamber which does not contain the heat storing material and which contains only the adsorbing material can effectively trap the fuel component remaining untrapped with the adsorbing material having the adsorption density and adsorbing ability enhanced by the packing of only the adsorbing material in the adsorption chamber, as compared to the mixture of the adsorbing material and the heat storing material. Therefore, the canister can prevent emission of the fuel component through the atmospheric air port securely.

It is desirable to make the sizes of the granular heat storing material and granular adsorbing material equal or approximately equal to each other, in order to restrain separation therebetween by aging, and to secure a passage for gas. In this embodiment, the average particle size of the granular formed heat storing material is in the range of 10%~300% of the average particle diameter of the granular adsorbing material, preferably in the range of 50%~150%. For example, the average particle size of the granular formed heat storing material is in the range from several hundred micro meters (µm)~several millimeters (mm). By adjusting the particle sizes of the granular heat storing material and adsorbing material in this way, and thereby securing adequate voids therebetween, it is possible to facilitate the adsorbing and desorbing operations, and to reduce the pressure loss in the canister. Moreover, the structure in which the outside surfaces of the adsorbing material are not covered by the powder of micro capsules is effective for preventing undesired influence such as decrease of the adsorbing speed.

As the adsorbing material, it is possible to use various known adsorbing materials such as activated carbon. The adsorbing material may be used in the form of particles each formed to have desired dimensions or may be prepared by crashing or pulverizing the adsorbing material such as activated carbon, and sifting the pulverized adsorbing material with a mesh of about 0.5 mm for example. As to the granular heat storing material, too, it is possible to prepare the granular material by pulverizing larger pieces of the heat storing material instead of forming particles of desired size from the beginning.

The formed heat storing material and adsorbing material are preferably prepared in the granular state composed of particles or granules having the particle size (or largest dimension or outside diameter) in the range of 1~5 mm. The shape of particles may be spherical, cylindrical (or columnar) or polygonal (or polyhedron). It is possible to employ particles of various shapes without limitation on the shape. In a preferable example, each of the formed heat storing material and adsorbing material is in the form of circular cylindrical pieces having a diameter of 1~3 mm and a length of 1~5 mm. The cylindrically formed heat storing material and adsorbing material can be produced easily by continuous extrusion and cutting or breaking. The use of cylindrical particles of the heat storing material and adsorbing material is advantageous in restraining separation over time between the heat storing material and adsorbing material.

The packing density (bulk density), i.e., weight per unit volume, of the formed heat storing material is preferably in the range of 0.1~1.5 g/cc. Similarly, the preferable rang of the packing density of the formed adsorbing material is 0.1~1.5 g/cc. A more desirable range of the packing density is 0.2~0.6 g/cc for both of the heat storing material and adsorbing material.

The packing density of the formed heat storing material is preferably 0.3 to 3 times the packing density of the adsorbing material. More desirably, the packing density of the formed heat storing material is 0.5 to 2 times the packing density of the adsorbing material. If the packing densities of the heat storing material and adsorbing material differ too much, the separation between both materials is promoted because the heavier material tends to descend in the casing when the canister installed in a vehicle is vibrated.

As to the mixture ratio between the heat storing material and adsorbing material, the formed heat storing material is preferably mixed with the adsorbing material so that the weight percent of the heat storing material is 5~40% with respect to the total quantity of the heat storing material and adsorbing material. More desirably, the weight percent of the heat storing material is 10~35% of the total weight of the heat storing material and adsorbing material. If the percentage of the formed heat storing material is too low, the canister becomes unable to restrain temperature change of the adsorbing material properly. If the percentage of the formed heat storing material is too high, the amount of the adsorbing material becomes smaller, and the adsorbing amount per unit volume of the canister becomes smaller. By employing micro capsules encapsulating the phase-change material, the canister according to this embodiment can provide sufficient heat storing performance with a relatively small percentage of the heat storing material, and improve the adsorbing quantity per unit volume.

According to this embodiment, the canister can restrain temperature change due to adsorption and desorption with a high heat storing or accumulating ability with the encapsulated phase-change material and thereby provide superior adsorbing performance. Furthermore, the micro capsules having the two-layer outer shell structure can reduce and prevent permeation effectively even in the case of blend fuel such as ethanol-blended gasoline, and thereby increase the length of time or service life of the canister during which the canister can work properly.

According to the embodiment of the present invention, granular heat storing material 6 and granular adsorbing material (or adsorbent) 7 were prepared in the following processes.

Figure 3:
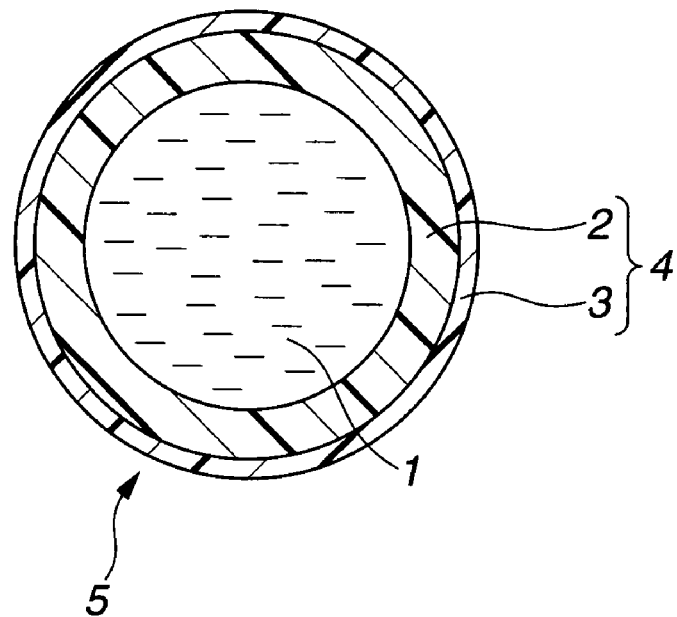
FIG. 3 is a schematic sectional view showing a micro capsule employed, as an example, in the embodiment according to the present invention.

An aqueous solution of melamine-formaldehyde initial condensate was prepared by adding 6.5 g of 37% aqueous formaldehyde solution and 10 g of water, to 5 g of melamine powder; then adjusting the pH of the thus-obtained mixture to pH8; and heating the mixture to a temperature of about 70° C. On the other hand, an emulsified liquid was prepared by adding a solution of 70 g of n-hexadecane as a phase-change substance, to 100 g of an aqueous solution of a styrene anhydride copolymer sodium salt adjusted to pH 4.5 with intense stirring; and causing emulsification until the particle diameter became about 7 µm (micrometer). Then, micro capsules were produced by adding the above-mentioned aqueous solution of melamine-formaldehyde initial condensate to this emulsified liquid; stirring the mixture at 70° C. for two hours; and adjusting the pH to pH 9. By this encapsulation, a slurry of intermediate heat storing particles each including a core of the phase-change substance 1 of n-hexadecane and an inner layer or film 2 of melamine resin encasing the core, as shown in FIG. 3.

After the completion of the reaction, micro capsules 5 having a particle diameter of about 7.2 µm (micrometer) were obtained by adding 5 g of 5% polyvinyl alcohol aqueous solution to the slurry of the intermediate heat storing particles; stirring the mixture again; and drying by spray dry method. The thus-obtained micro capsules 5 had a structure having a two-layer outer shell 4 composed of the above-mentioned inner layer 2 of melamine resin, and an outer layer or coating layer 3 of polyvinyl alcohol covering the surface of the inner layer 2, as shown in FIG. 3.

Figure 4:
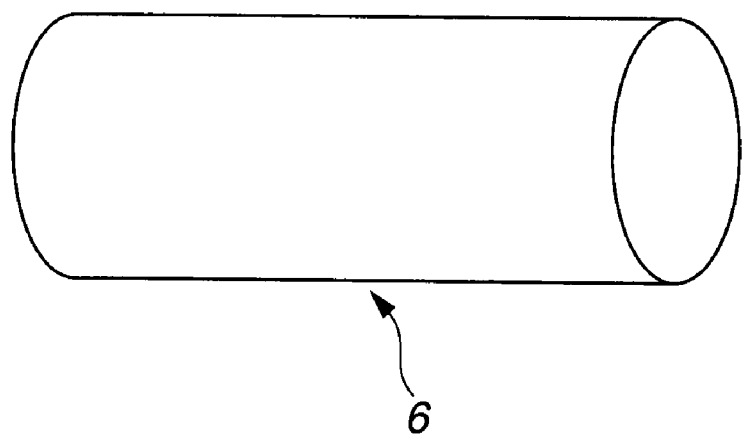
FIG. 4 is a perspective view showing a particle of a formed heat storing material employed, as an example, in the embodiment of the present invention.

Then, the heat storing material 6 in the granular form as shown in FIG. 4 was obtained by adding phenol resin emulsion to the micro capsules 5 in the powdered state in the proportion of 5 parts by weight of phenol resin as a binder to 95 parts by weight of the micro capsules 5; kneading the mixture; forming the mixture into a cylindrical shape by extrusion with an extruding machine; cutting to an appropriate length to form a cylinder having a diameter of about 2 mm and a length of about 5 mm; and heating at 130° C. for 3 hours.

Figure 2:
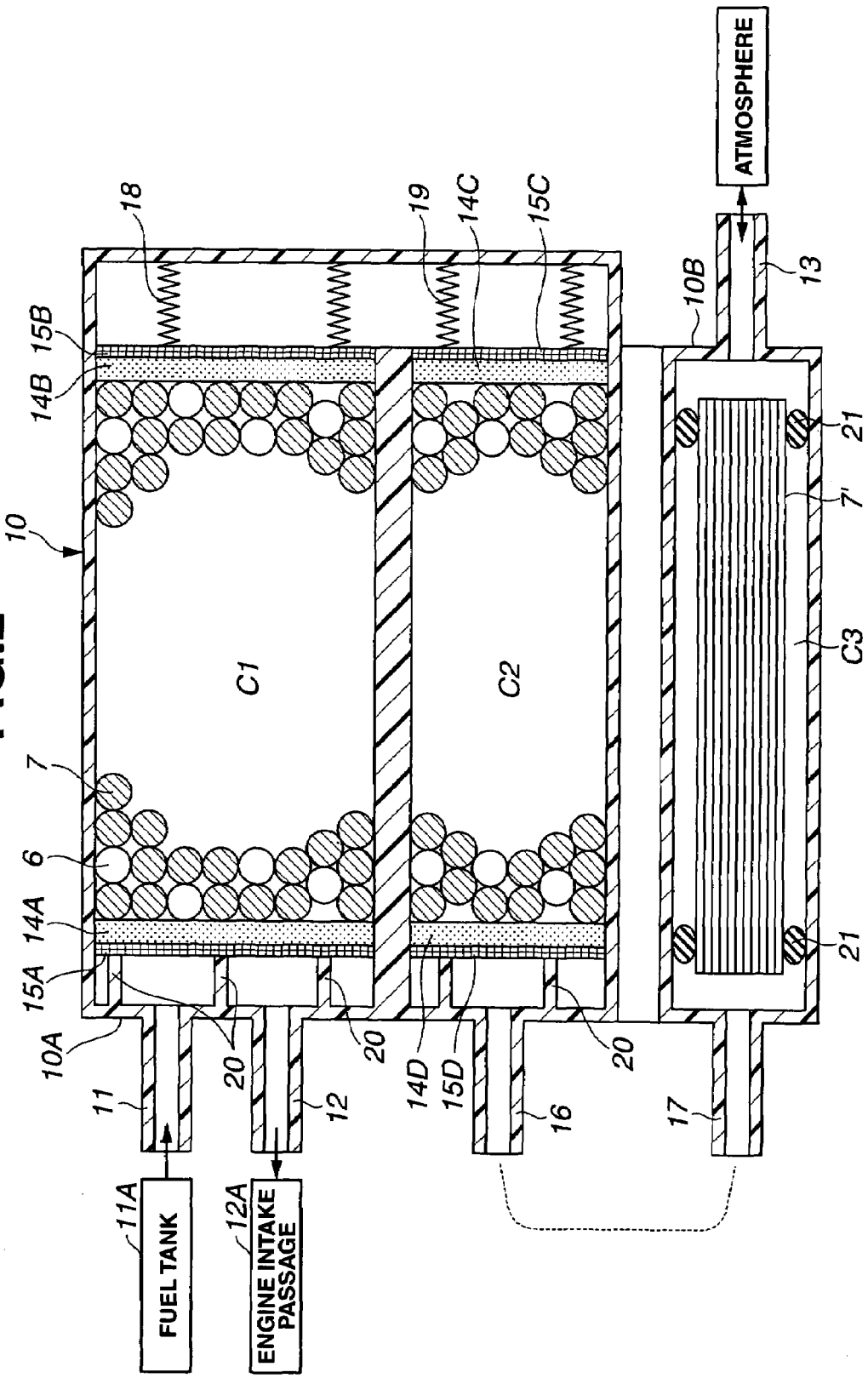
FIG. 2 is a schematic sectional view showing a canister of a second practical example according to the embodiment of the present invention.

The adsorbing material or adsorbent 7 in the granular form (as shown in FIGS. 1 and 2) was obtained by kneading a woody phosphoric acid activated carbon in the powdered form with a binder such as bentonite, magnesium or alumina; forming the mixture into a cylindrical shape having a diameter of about 2 mm and a length of about 5 mm by extrusion in the same manner as mentioned above; and calcination.

FIG. 1 schematically shows, in section, a canister for a vehicle, in a first practical example according to the embodiment of the present invention. The canister includes a casing 10 having therein a gas passage C for conveying fuel vapor. Casing 10 of this example is made of synthetic resin such as Nylon (Trade Mark). Gas passage C extends, like the shape of the letter "S", from a first passage end to a second passage end. The first passage end of gas passage C includes a charge port 11 and a purge port 12 which are formed in a first end wall (or fuel vapor inlet/outlet end wall) 10A. The second passage end of gas passage C includes an atmospheric air port 13 formed in a second end wall (or atmospheric side end wall) 10B of casing 10. Charge port 11 is adapted to be connected with a fuel tank 11A by a pipe (not shown). Purge port 12 is adapted to be connected with an intake side 12A of an internal combustion engine. In this example, intake side 12A includes an intake passage, and purge port 12 is connected with the intake passage of the engine. Atmospheric air port 13 opens to the atmosphere.

Gas passage C includes first, second and third chambers C1, C2 and C3 which are connected in series. In the longitudinal direction of gas passage C, the first chamber C1 is located between the second chamber C2 and the first passage end formed with the charge port 11 and purge port 12; the second chamber C2 is located between the first and third chambers C1 and C3; and the third chamber C3 is located between the second chamber C2 and the second passage end formed with the air port 13. The first chamber C1 is a first heat storing (or heat accumulating) and adsorbing chamber. The second chamber C2 is a second heat storing (or heat accumulating) and adsorbing chamber. The third chamber C3 is an adsorption chamber. Each of the first and second heat storing and adsorbing chambers C1 and C2 is filled with adsorbing material 7 and heat storing material 6. The adsorption chamber C3 is filled only with the adsorbing material 7, and the heat storing material 6 is not contained in adsorption chamber C3. First chamber C1 is defined between first and second permeable partitions each composed of a permeable screen 14A or 14B of nonwoven fabric or urethane and a permeable punched or perforated metal member 15A or 15B for retaining the shape. Similarly, second chamber C2 is defined between third and fourth permeable partitions each composed of a permeable screen 14C or 14D of nonwoven fabric or urethane and a permeable punched or perforated metal member 15C or 15D for retaining the shape. Third chamber C3 is defined between fifth and sixth permeable partitions each composed of a permeable screen 14E or 14F of nonwoven fabric or urethane and a permeable punched metal member 15E or 15F for retaining the shape. The second and third chambers C2 and C3 are connected by a pipe (shown schematically by a broken line) extending from a first end connected with a first connection port 16 on the second chamber's side and a second end connected with a second connection port 17 on the third chamber's side. Pieces (or particles or pellets) of the heat storing material 6 and adsorbing material (adsorbent) 7 are cylindrical, in this example. In FIG. 1, the cylindrical pieces of heat storing material 6 and adsorbing material 7 are shown by small circles for simplification. In the example of FIG. 1, the gas passage C extends in the S-shaped form, and the first, forth and fifth permeable partitions (14A, 15A; 14D, 15D; 14E, 15E) are on the first side (fuel vapor inlet/outlet side) which is the left side as viewed in FIG. 1, whereas the second, third and sixth permeable partitions (14B, 15B; 14C, 15C; 14F, 15F) are on the second side (atmospheric air inlet side) which is opposite to the first side and which is the right side as viewed in FIG. 1.

Fuel vapor is generated in fuel tank 11A in a stop state of a vehicle, for example. Fuel vapor is introduced from fuel tank 11A into the gas passage C through charge port 11, and adsorbed by the adsorbing material 7 in the canister. In the engine operating state, ambient air is introduced into gas passage C from atmospheric air port 13 in a predetermined engine operating condition, and fuel component adsorbed by adsorbing material 7 is released and supplied into the engine intake passage 12A through purge port 12. Therefore, the fuel component is burnt and processed in the engine. Thus, the fuel vapor is purged from the canister.

Each of first and second heat storing and adsorbing chambers C1 and C2 on the side closer to the charge and purge ports 11 and 12 includes therein the granular formed heat storing material 6 and the formed granular adsorbing material 7 which are mixed so that the volume percent of granular heat storing material 6 is 10 vol %, and the volume percent of granular adsorbing material 7 is 90 vol %. Each of the heat storing and adsorbing chambers C1 and C2 is filled with the mixture of heat storing material 6 and adsorbing material 7. The adsorption chamber C3 on the side closer to the atmospheric air port 13 does not includes the heat storing material 6, but includes therein the adsorbing material 7 only. The adsorption chamber C3 is filled with the adsorbing material 7.

A first spring 18 serving as an urging member is disposed in a first space (unfilled) chamber C4 which is separated from the first heat storing and adsorbing chamber C1, by the (second) permeable partition composed of the filter 14B and punched metal member 15B. This permeable partition serves as a movable partition. The first spring 18 is arranged to urge this movable partition toward the first heat storing and adsorbing chamber C1 in the longitudinal direction of the gas passage C to reduce the volume of first heat storing and adsorbing chamber C1. Therefore, the first spring 18 holds the inside of first heat storing and adsorbing chamber C1 in a pressurized state. Similarly, a second spring 19 serving as an urging member is disposed in a second space (unfilled) chamber C5 which is separated from the second heat storing and adsorbing chamber C2, by the (third) permeable partition which is composed of the filter 14C and punched metal member 15C, and which is arranged to serve as a movable partition. The second spring 19 is arranged to urge this movable partition toward the second heat storing and adsorbing chamber C2 in the longitudinal direction of the gas passage C to reduce the volume of second heat storing and adsorbing chamber C2. Therefore, the second spring 19 holds the inside of second heat storing and adsorbing chamber C2 in a pressurized state. The casing 10 includes ribs 20 projecting and abutting against the first permeable partition composed of screen 14A and punched metal member 15A, the fourth permeable partition composed of screen 14D and punched metal member 15D, the fifth permeable partition composed of screen 14E and punched metal member 15E and the sixth permeable partition composed of screen 14F and punched metal member 15F.

Therefore, except for the second and third permeable partitions urged, respectively, by the first and second springs 18 and 19, the first, fourth, fifth and sixth partitions are fixed partitions held in position by abutment against the projecting ribs 20 of casing 10. The first and second space chambers C4 and C5 are connected with each other. The first and second chambers C1 and C2 are formed between the space chambers C4 and C5 on the right side as viewed in FIG. 1, and the first side wall 10A formed with charge port 11, purge port 12 and connection port 16 on the left side as viewed in FIG. 1. In the example shown in FIG. 1, the cross sectional size of first chamber C1 (that is, the cross sectional size of the fluid passage in first chamber C1) is greater than that of second chamber C2. The cross sectional size of third chamber C3 is smallest.

FIG. 2 schematically shows, in section, a canister in a second practical example according to the embodiment of the present invention. The canister of FIG. 2 is substantially identical to the canister of FIG. 1 except for the adsorption chamber C3. Accordingly, the same reference numerals are used for the corresponding parts and repetitive explanation is omitted. The adsorption chamber C3 shown in FIG. 2 contains a honeycomb type adsorbing material 7' of activated carbon which is slightly smaller in size than the inside of adsorption chamber C3. This honeycomb type adsorbing material 7' is held stationary and fixed by first and second seal members 21 inside the adsorption chamber C3. In this example, each of the first and second seal members 21 is an O ring. First and second seal members 21 are spaced in the longitudinal direction of the gas passage. First seal member 21 is located near the connection port 17, and second seal member 21 is located near the air port 13. The honeycomb adsorbing material 7' can be produced, for example, by a process similar to the above-mentioned production process of producing the granular adsorbing material 7.

According to this embodiment, the canister can significantly reduce and restrain temperature change due to adsorption and desorption with a high heat storing or accumulating ability utilizing the latent heat of the phase-change material encapsulated in the form of micro capsules 5, and provide superior adsorbing performance as canister. Furthermore, the micro capsules having the two-layer outer shell structure having the inner layer 2 of thermosetting resin and the outer layer 3 of hydrophilic thermoplastic resin can reduce and prevent permeation effectively even in the case of blend fuel such as ethanol-blended gasoline, and thereby increase the length of time or service life of the canister during which the canister can work properly.

Furthermore, by the urging member such as the springs 18 and 19, the heat storing and adsorbing chamber (C1 or C2) is always held in the pressurized state. Therefore, the canister can hold the heat storing material and the adsorbing material stably and steadfastly in the chamber even when the volumes of the heat storing material and adsorbing material are increased or decreased. As a result, the canister can protect the heat storage material against deterioration and damage due to vibration and abrasion, and reliably prevent micro capsules cemented together by the binder from being removed and drawn into the intake system of the engine.

The first and second heat storing and adsorbing chambers C1 and C2 on the side closer to the charge port 11 and purge port 12 are filled with the heat storing material 6 and the adsorbing material 7. Therefore, during the charging operation of charging fuel vapor into the canister for adsorption, the fuel vapor is first adsorbed in the adsorbing material in the first and second heat storing and adsorbing chambers C1 and C2 located in the gas passage at an upstream position closer to the charge port, and heat generated by the adsorption is absorbed and canceled effectively by the heat storing material 6. Therefore, the heat storing and adsorbing chambers C1 and C2 can maintain the adsorbing ability without being adversely affected by the heat, and trap most of the fuel component effectively. The adsorption chamber C3 closer to the air port 13 (that is, at the position between the heat storing and adsorbing chambers C1 and C2, and the air port 13) is filled with the granular adsorbing material 7 or 7' only (without the heat storing material 6). Therefore, the adsorption chamber C3 can effectively trap the fuel component remaining untrapped in the gas stream, with the adsorbing material packed densely at a high packing density with a high adsorbing ability, as compared to the mixture of the adsorbing material and the heat storing material. Therefore, the canister can prevent emission of the fuel component through the atmospheric air port securely.

The present invention is not limited to the above-mentioned embodiment. Various modifications and variations are possible within the purview of the present invention. For example, the outer shell 4 of the micro capsule 5 may be a multilayer structure having three or more layers though the outer shell 4 shown in FIG. 3 has the two-layer structure.

According to an aspect of the present invention as illustrated in the embodiment, a granular heat storing material comprises capsules, such as micro capsules, each including a phase-change material enclosed in a multilayer outer shell which includes at least an inner layer of a hydrophobic resin and an outer layer of a hydrophilic resin covering the inner layer. A method of producing a granular heat storing material comprises (i) preparing an intermediate heat storing material including intermediate capsules each including a core of a phase-change material and an inner layer of a hydrophobic resin enclosing the core; (ii) preparing a subsequent heat storing material including multilayer capsules each including the core of the phase-change material, the inner layer of the hydrophobic resin enclosing the core and an outer layer of a hydrophilic resin enclosing the inner layer, by producing a mixture of the hydrophilic resin and the intermediate heat storing material and drying the mixture. The mixture of the hydrophilic resin and the intermediate heat storing material may be produced by adding an aqueous solution of the hydrophilic resin to a slurry of the intermediate heat storing material. The method of producing the granular heat storing material may further comprises adding a binder to the subsequent heat storing material, and forming formed particles or grains or pellets of a mixture of the binder and the subsequent heat storing material.

This application is based on a prior Japanese Patent Application No. 2006-247557 filed in Japan on Sep. 13, 2006. The entire contents of this Japanese Patent Application No. 2006-247557 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A canister comprising:
   a casing including a gas passage which extends from a first passage end formed with a charge port to let in fuel vapor and a purge port to let out the fuel vapor, to a second passage end formed with an atmospheric air port to let in air, and which includes a heat storing and adsorbing chamber;

a granular adsorbing material held in the heat storing and adsorbing chamber; and a granular heat storing material held in the heat storing and adsorbing chamber together with the granular adsorbing material, the granular heat storing material containing capsules each including a phase-change material enclosed in a multilayer outer shell including an inner layer of a hydrophobic resin and an outer layer of a hydrophilic resin covering the inner layer.

2. The canister as claimed in claim 1, wherein the granular heat storing material is in the form of particles formed by the capsules with a binder.

3. The canister as claimed in claim 1, wherein the outer layer comprises polyvinyl alcohol, and the binder comprises phenolic resin.

4. The canister as claimed in claim 1, wherein the canister further comprises an urging member arranged to compress the heat storing and adsorbing chamber by urging a movable partition separating the heat storing and adsorbing chamber from a space chamber, toward the heat storing and adsorbing chamber.

5. The canister as claimed in claim 1, wherein the casing includes an adsorption chamber which contains an adsorbing material only, and which is formed in the gas passage at a position between the heat storing and adsorbing chamber and the atmospheric air port.

6. The canister as claimed in claim 5, wherein the adsorbing material in the adsorption chamber is granular.

7. The canister as claimed in claim 5, wherein the heat storing and adsorbing chamber is a first heat storing and adsorbing chamber filled with the granular heat storing material and the granular adsorbing material; the casing further includes a second heat storing and adsorbing chamber which is filled with the granular heat storing material and the granular adsorbing material and which is located between the first heat storing and adsorbing chamber and the adsorption chamber in a longitudinal direction of the gas passage.

8. The canister as claimed in claim 1, wherein the outer layer of a hydrophilic resin is in direct contact with the inner layer of a hydrophobic resin.

* * * * *

UNITED STATES PATENT AND TRADEMARK OFFICE
CERTIFICATE OF CORRECTION

PATENT NO. : 7,543,574 B2
APPLICATION NO. : 11/896693
DATED : June 9, 2009
INVENTOR(S) : Koji Yamazaki, Takashi Hasumi and Kenji Seki It is certified that error appears in the above-identified patent and that said Letters Patent is hereby corrected as shown below:

Title Page; item (73);

On the front cover of the Patent the second Assignee should read:

Osaka Gas Co. Ltd., Osaka-shi (JP)

Signed and Sealed this

Twenty-fifth Day of August, 2009

David J. Kappos
*Director of the United States Patent and Trademark Office*